J. T. DEMPSTER.
VIBRATING RECTIFIER.
APPLICATION FILED SEPT. 18, 1914.
1,188,157.
Patented June 20, 1916.
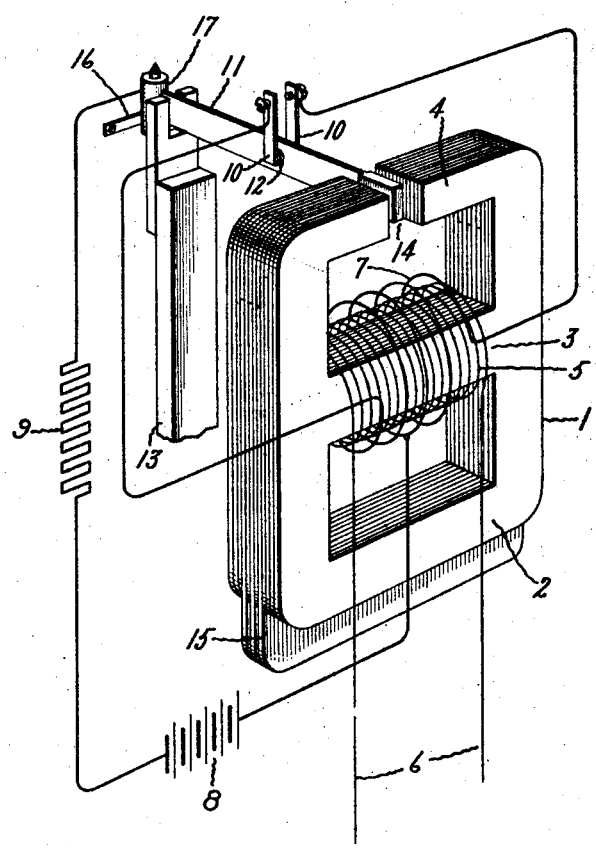
Witnesses:
George H. Tilden
J. Ellis Glen.
Inventor:
John T. Dempster,
by Albert G. Davis
His Attorney.

UNITED STATES PATENT OFFICE.

JOHN T. DEMPSTER, OF SCHENECTADY, NEW YORK, ASSIGNOR TO GENERAL ELECTRIC COMPANY, A CORPORATION OF NEW YORK.

VIBRATING RECTIFIER.

1,188,157.   Specification of Letters Patent.   Patented June 20, 1916.

Application filed September 18, 1914. Serial No. 862,334.

*To all whom it may concern:*

Be it known that I, JOHN T. DEMPSTER, a citizen of the United States, residing at Schenectady, county of Schenectady, State of New York, have invented certain new and useful Improvements in Vibrating Rectifiers, of which the following is a specification.

My present invention relates to apparatus for converting alternating current into direct current, and more especially to apparatus of the type commonly known as vibrating rectifiers. In devices of this nature a contact carrying armature is caused to oscillate or vibrate in synchronism with changes in direction of the alternating current supply and shift the circuit connections in such a way as to produce unidirectional current in an external or load circuit. Since such a device is adapted only for the rectification of comparatively low voltages the alternating current supply is usually derived from a transformer designed to step down the ordinary commercial circuit voltage to the voltage desired for rectification. In addition to the supply circuit it has also been customary heretofore to provide a shunt circuit to energize suitable electromagnetic apparatus and produce an alternating flux for the operation of the vibrating armature. One illustration of such a device is described in U. S. Patent #1,019,608, granted to me on March 5, 1912.

One object of my present invention is to avoid the necessity of an extra circuit for the operation of the armature. I accomplish this by making use of the flux set up in the transformer.

The novel features of my invention are pointed out in the accompanying claims; the invention itself, however, with further objects and advantages thereof will best be understood by reference to the following description taken in connection with the accompanying drawing in which I have shown a somewhat diagrammatic perspective view of my device together with the necessary circuit connections.

As here indicated the transformer comprises a laminated iron core 1 having three legs 2, 3 and 4. The primary winding 5 which surrounds the central leg 3 is connected to the alternating current supply mains 6. The middle point of the secondary 7 of the transformer, which is also wound around the central leg 3, forms one terminal of the external circuit which is to be supplied with unidirectional current. This circuit may include the battery 8 or any current consuming device desired. If the rectifier is to be used for charging a battery a resistance 9 is preferably inserted in series with the battery. The ends of the transformer secondary are connected to contacts 10 mounted preferably on flexible supports a short distance from the pivoted armature 11 as indicated. The second terminal of the direct current circuit is connected to this armature and contacts 12 mounted on each side of the armature coöperate with the contacts 10 to give the desired circuit connections. In order to give the armature a constant polarity the pivoted end is mounted in proximity to a permanent magnet 13 having a slotted projection on its end. The free end of the armature is located in the air gap 14 in leg 4 of the transformer.

With the arrangement of apparatus described it will be seen that the main flux set up in the transformer will pass through the leg 2 of the core while a smaller portion will pass through the shunt path provided by leg 4 and the air gap 14. This flux which passes through the shunt path will cause the armature 11 to vibrate between contacts 10 in synchronism with the alternations of the supply current and thus shift the connections between the supply circuit and the direct current circuit with every reversal in the direction of the flux. While the principle of operation of this type of apparatus is comparatively simple great difficulty has heretofore been experienced in so proportioning the various parts that contact will be broken by the armature at a time when the value of the supply current is substantially zero. Freedom from sparking at the contacts and the maximum efficiency of the device depend upon breaking the contact at the proper time. Where a separate circuit has been provided to produce the flux for operating the armature, attempts have been made to secure the proper time relations by the use of inductance or capacity to vary the phase relations between the current in the two circuits. I have found, however, that with the present arrangement the desired adjustment may be secured by merely varying the strength of the flux in the air gap 14. Because of the extremely complex relations between current, electromotive force and flux in the various parts of the apparatus I am unable to state at the present time the precise reason why this is possible. In general, however, I have found that the stronger the flux in the air gap the longer the breaking of contact will be delayed. Hence by so proportioning the transformer that the flux in the air gap is originally so strong that the current is broken after it has passed its zero value and then by gradually weakening the air gap flux, I am able to secure the desired adjustment and cause the contact to be broken without any injurious sparking. This weakening of the air gap flux may be conveniently brought about by inserting extra laminations 15 in that part of the core which is traversed only by the main flux. This decreases the magnetic reluctance of the main flux path and causes a greater proportion of the total flux to pass through that path, and hence a smaller proportion through the air gap.

In case the alternating current supply is suddenly interrupted when the rectifier is being used to charge a battery, the battery will discharge through the secondary of the transformer and reverse the flux through the air gap. This will cause the armature to break contact, and if the impulse given the armature is strong enough it will make contact on the opposite side and cause the battery to discharge through the secondary of the transformer in the opposite direction thus causing the armature to continue its vibration. This action may be prevented by damping the movement of the armature by means of a flat spring 16 bearing upon the shaft 17, which carries the armature.

While I have illustrated and described in a general way certain instrumentalities which may be employed in carrying my invention into effect, it is evident that many modifications may be made in the various details without departing from the scope of the appended claims.

What I claim as new and desire to secure by Letters Patent of the United States, is:—

1. The combination in current rectifying apparatus of a transformer having a closed main path for the magnetic flux and a shunt path for the magnetic flux having an air gap therein, the two paths being coincident only in the portions covered by the transformer windings, and a movable armature having a free end located in said air gap so as to be actuated by the flux set up in the shunt path.

2. The combination in current rectifying apparatus of a transformer having a main path for the magnetic flux composed entirely of iron and a shunt path for the magnetic flux having an air gap therein, the two paths being coincident only in the portions covered by the transformer windings, a movable armature having a free end located in said air gap so as to be actuated by the flux set up in the shunt path and coöperating switching contacts actuated by the movement of said armature so as to deliver alternating impulses of current as a succession of unidirectional impulses.

3. The combination with a source of alternating current of a transformer having a closed main magnetic circuit and a shunt magnetic circuit having an air gap therein, a movable polarized armature having one end pivoted and the opposite end located in said air gap so as to move back and forth across the gap with reversals in direction of the magnetic flux therein, and coöperating switching contacts actuated by the movement of said armature so as to deliver alternating impulses of current as a succession of unidirectional impulses, the two magnetic circuits being so proportioned that the contacts will be broken when the value of the current in the secondary of the transformer is substantially zero.

4. In a mechanical rectifier the combination of a transformer having a closed magnetic circuit and a second magnetic circuit with an air gap therein which is short in comparison with the total length of the circuit, a polarized pivoted armature having a free end located in said air gap so as to oscillate with changes in the direction of the magnetic flux in the air gap, and contacts coöperating therewith whereby unidirectional current impulses may be obtained from the secondary of the transformer and delivered to an external circuit.

5. The combination in rectifying apparatus of a transformer having a closed main magnetic circuit and a shunt magnetic circuit having an air gap therein, a movable armature having a free end located in said air gap so as to be actuated by the flux set up therein, and coöperating switching contacts actuated by the movement of said armature so as to deliver alternating impulses of current as a succession of unidirectional impulses, the strength of the flux in said air gap being so adjusted by varying the relative reluctance of the two circuits that the armature will cause the contacts to be broken without injurious sparking.

6. The combination with a source of alternating current of a transformer having primary and secondary windings, a closed main magnetic path and a shunt magnetic path having an air gap therein, a polarized armature having one end pivoted and the opposite free end located in said air gap so as to be actuated by the changes in the direction of the flux through said air gap, contacts carried by said armature, contacts mounted at each side of said armature and connected with the terminals of the secondary of the transformer, and an external circuit connected between the middle point of the secondary of said transformer and said armature.

7. The combination with a source of alternating current, of rectifying means comprising a movable armature having one end pivoted, a permanent magnet having one of its poles in proximity to the pivoted end of said armature, means for producing an alternating magnetic flux to act upon the free end of said armature and cause it to vibrate in unison with the alternations in the flux, contacts carried by said armature at a point intermediate the ends and flexibly mounted contacts so arranged as to coöperate with said armature contacts, and deliver alternating impulses of current as a succession of unidirectional impulses.

8. The combination with a source of alternating current of a transformer having a closed magnetic circuit and a shunt magnetic circuit having an air gap therein, an armature having one end pivoted and having its opposite free end located in said air gap, and a permanent magnet having one of its poles in proximity to the pivoted end of said armature.

9. The combination with a source of alternating current, of means for producing a magnetic flux pulsating in synchronism with said current, an armature carried by a pivoted shaft so as to be free to vibrate with changes in the direction of said flux and a spring member frictionally engaging said pivoted shaft.

10. The combination in current rectifying apparatus of a transformer having a closed main magnetic circuit and a shunt magnetic circuit having an air gap therein, an armature carried by a pivoted shaft and having one end so arranged as to be free to vibrate with changes in the direction of the flux in said air gap, and a spring member frictionally engaging said pivoted shaft.

11. The combination with a source of alternating current of a transformer having a closed main magnetic circuit and a shunt magnetic circuit having an air gap therein, an armature carried by a pivoted shaft and so arranged as to be free to vibrate with changes in direction of the flux in said air gap, an external circuit containing a storage battery, coöperating switching contacts actuated by the movement of said armature so as to deliver alternating impulses of current to said storage battery as a succession of unidirectional impulses, and a spring member frictionally engaging said pivoted shaft to prevent the discharge of the battery when the alternating current supply is interrupted.

In witness whereof, I have hereunto set my hand this 17th day of September, 1914.

JOHN T. DEMPSTER.

Witnesses:
BENJAMIN B. HULL,
BENJ. H. WEISBROD.